Oct. 29, 1935.  A. P. BALL  2,019,110
AUTOMOBILE BODY CONSTRUCTION
Filed Oct. 29, 1932  3 Sheets-Sheet 1
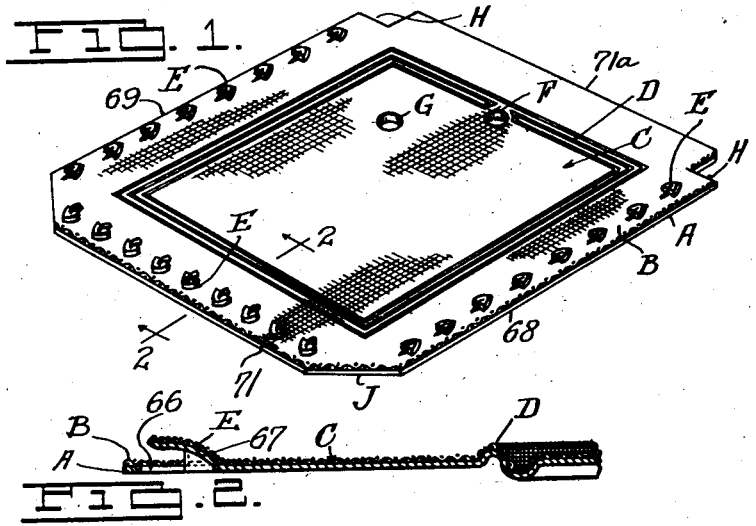
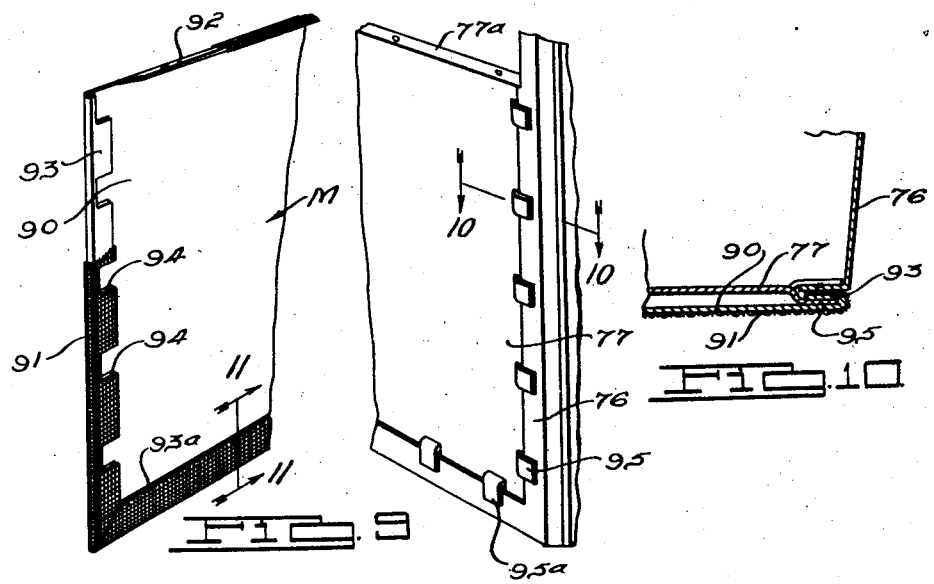
INVENTOR
Albert P. Ball.
BY
Dike, Calver & Gray
ATTORNEYS.

Oct. 29, 1935.  A. P. BALL  2,019,110
AUTOMOBILE BODY CONSTRUCTION
Filed Oct. 29, 1932  3 Sheets-Sheet 2
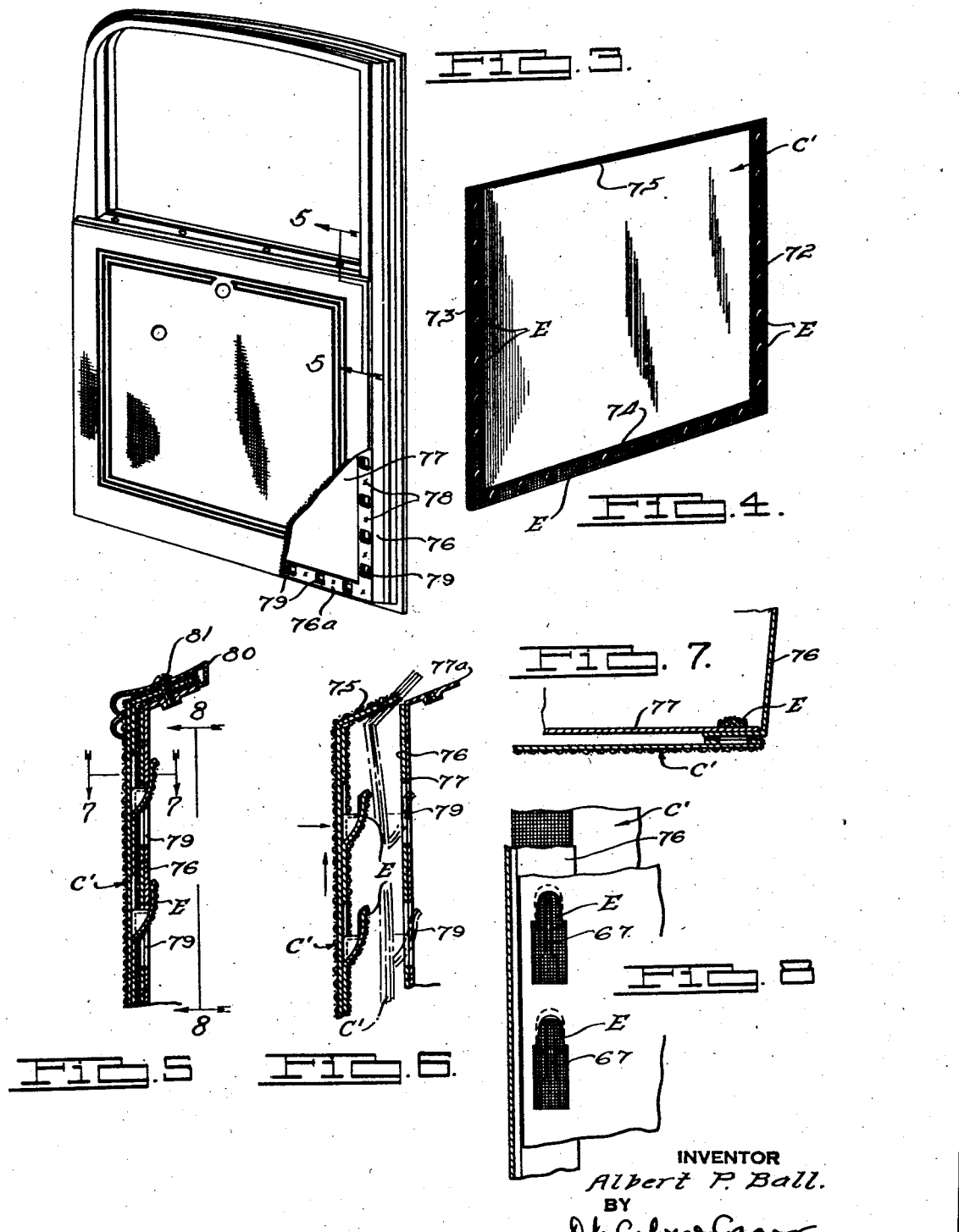
INVENTOR
Albert P. Ball.
BY
Dike, Calvert & Gray
ATTORNEYS.

Oct. 29, 1935.  A. P. BALL  2,019,110
AUTOMOBILE BODY CONSTRUCTION
Filed Oct. 29, 1932  3 Sheets-Sheet 3
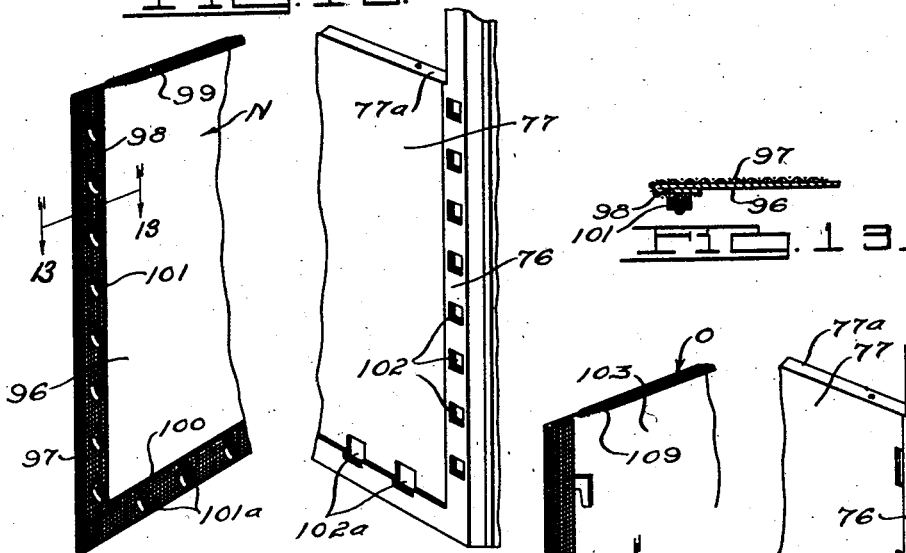
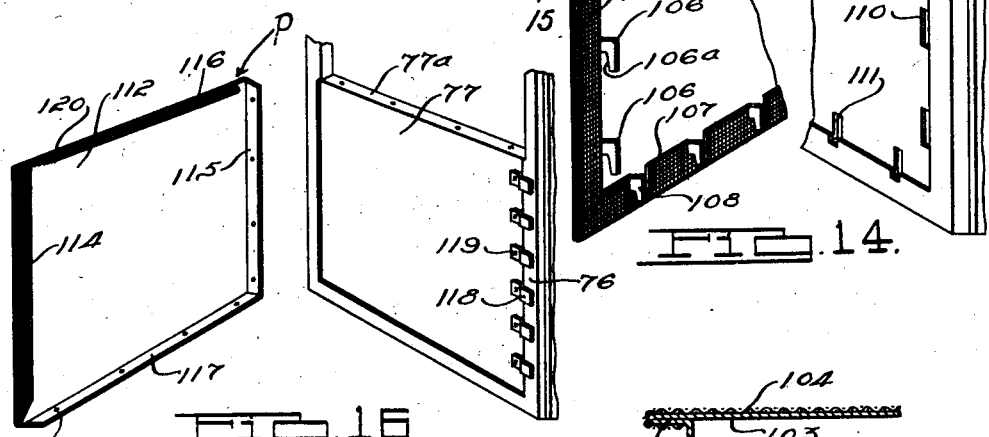
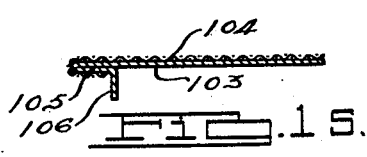
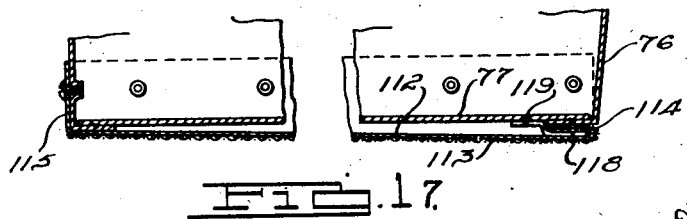
INVENTOR
*Albert P. Ball.*
BY
*Dike, Calver & Gray*
ATTORNEYS.

Patented Oct. 29, 1935

2,019,110

UNITED STATES PATENT OFFICE 2,019,110

AUTOMOBILE BODY CONSTRUCTION

Albert P. Ball, Detroit, Mich., assignor to Briggs Manufacturing Company, Detroit, Mich., a corporation of Michigan Application October 29, 1932, Serial No. 640,235

13 Claims. (Cl. 45—138)

This invention relates to automobile body construction, and more particularly to a new and improved method of forming, constructing and applying the trim portions of the body.

According to conventional practice in the manufacture of automobile bodies the interior body trim is prepared in the form of panels usually composed of non-metallic backing sheets covered with the trim fabric, and these trim panels are usually attached in position to the doors or other frame parts of the body by means of separate concealed snap fasteners. These fasteners are often in the form of bent wire devices which must be anchored by hand in apertures in retainer plates secured to the back of each trim panel and which, when the trim panel is assembled on the body frame, fasten into apertures in the latter. This mode of fastening the trim panels to the body frame has certain important disadvantages. Because of the large numbers of these fastener devices and retainer plates required for each body, and the time, labor and expense necessary for their manufacture and installation, the utilization thereof in practice has accounted for a substantial item of expense in the manufacture of automobile bodies, particularly in the mass production thereof.

An object of the present invention is to eliminate these disadvantages, simplify and improve the construction of the trim portions of the body, and provide an improved and better means for fastening the trim panels to the body frame whereby substantial manufacturing economies are obtained while at the same time providing a more satisfactory and efficient construction.

A further object of the invention is to provide an improved body construction wherein the trim panel and body frame portion are provided before assembly of the parts with cooperating fastener devices, formed as permanent parts thereof, and so constructed that the trim panel may be assembled on the body without requiring, as heretofore, the employment of separate intervening fasteners.

Another object of the invention is to provide a trim panel of improved construction which may be more readily and inexpensively produced.

A further object is to provide a trim panel of improved composite formation having a metallic backing for the trim fabric, and in which the metal portion of the panel is provided with unitary portions effective in cooperation with unitary fastener portions formed on the body frame to permit easy attachment of the trim panel.

A further object of the invention is to provide an improved means for fastening together the trim and body panels wherein one of these panels has hook shaped fastener members of a relatively rigid nature either formed integrally from the metal of the panel or permanently mounted thereon, as by welding, wherein the other panel has mating openings or recesses to receive these fasteners, and wherein the panels may be relatively shifted to clamp them together through the cooperative action of the fastener lugs and the relatively rigid metallic edges of the panel openings.

Other objects of this invention will appear in the following description and appended claims, reference being had to the accompanying drawings forming a part of this specification wherein like reference characters designate corresponding parts in the several views.

Fig. 1 is a perspective view of a partially formed trim panel embodying the present invention.

Fig. 2 is an enlarged section taken through lines 2—2 of Fig. 1 in the direction of the arrows.

Fig. 3 is a perspective view of a door of a vehicle body, partly broken away, illustrating a trim panel in assembled relation to the door.

Fig. 4 is a perspective view of the finished trim panel illustrated in Fig. 3.

Fig. 5 is a fragmentary section taken through lines 5—5 of Fig. 3.

Fig. 6 is a view similar to Fig. 5 illustrating the parts preparatory to their assembly.

Fig. 7 is a detail section taken through lines 7—7 of Fig. 5 in the direction of the arrows.

Fig. 8 is a detail rear view taken from lines 8—8 of Fig. 5 in the direction of the arrows.

Fig. 9 is a fragmentary perspective view of a trim and body panel before assembly illustrating a modification in the means for fastening the parts together.

Fig. 10 is a detail section taken through lines 10—10 of Fig. 9 in the direction of the arrows, after the trim has been assembled on the body panel.

Fig. 11 is a detail section taken through lines 11—11 of Fig. 9 in the direction of the arrows.

Fig. 12 is a fragmentary perspective view of a trim panel and a body panel before assembly illustrating another modification in the means for fastening the parts together.

Fig. 13 is a detail section taken through lines 13—13 of Fig. 12 in the direction of the arrows.

Fig. 14 is a fragmentary perspective view of a trim panel and a body panel before assembly illustrating another modification in the means for fastening the parts together.

Fig. 15 is a detail section taken through lines 15—15 of Fig. 14 in the direction of the arrows.

Fig. 16 is a fragmentary perspective view of a trim panel and a body panel before assembly illustrating a further modification in the means for fastening the parts together; and Fig. 17 is a broken horizontal section taken through the assembled panel structure of Fig. 16.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to Figs. 1 and 2, the trim panel which is constructed in such manner that it may be readily fastened to the door frame or other frame portion of the automobile body, preferably comprises a foundation or backing strip and a fabric strip cemented thereto so as to produce a composite laminated panel. In this embodiment the composite panel comprises a foundation or backing blank of relatively thin sheet metal, such as sheet steel, and after the trim fabric has been applied and united to the metal blank, the composite sheet may be integrally formed with fastening means, embossed pattern portions, and may be trimmed and cut either into final form or into nearly finished condition. Suitable apparatus (not shown) is employed for the purpose of producing in a continuous manner the composite trim panels, these panels in the present case being illustrated as a two-ply laminated structure although it is understood that the invention is equally adapted for the production and use of panels consisting of three or more plies.

Apparatus of the character shown in my copending application Serial No. 636,544, filed October 6, 1932, may be employed for producing composite trim panels of the character herein described, the present application being a continuation in part of said co-pending application.

In Fig. 1 there is illustrated, by way of example, one form of trim panel C which may be produced in the apparatus, this panel being finished except for edge folding and flanging operation. In this instance the panel comprises a foundation or backing portion A of thin sheet steel to which is cemented a top fabric portion B. The composite panel is pressed to provide a suitable pattern such as the embossed portion D and also to provide pierced openings F and G through which extend, where the trim panel is used on the door of the automobile, the shanks of the door handle and window regulator crank handle. The panel C, in this instance, is also punched or pressed along three side edges thereof to form a series of fastener lugs E, the metal and fabric being struck out at 66 (Fig. 2) and their inherent rigidity is preferably increased by providing them with longitudinal stiffening ribs 67 which extend centrally of the lugs and continue into the body of the metal sheet A. The edges of the laminated sheet are trimmed to provide the proper sized blanks having sheared edges 68, 69, 71, 71a and the portions H and J are cut away.

In Fig. 4 there is illustrated a finished panel C' ready for assembly on the frame portion of the body, such as the door. The finished panel C' may be produced from the panel C by folding the edges 68 and 69 of the latter over against the back face of the metal sheet to provide the edge folds 72 and 73 (Fig. 4) each having a series of projecting fastener lugs E which in this instance project upwardly. In addition the lower edge 71 of the panel C (Fig. 1) is folded over to produce the edge fold 74 (Fig. 4) whereby the fastener lugs E at the lower edge of the panel will also project upwardly in the same direction as the lugs at the vertical sides of the panel. Also the upper edge 71a of the panel C is flanged as shown at 75 in Fig. 4. The edge folding and flanging operations may be accomplished in a single operation by means of suitable die mechanism.

In the embodiment illustrated in Figs. 3 to 8 inclusive, the completed trim panel C' is thus formed with integral projecting fastener lugs. This panel is adapted to be fastened to the frame portion of the body, such as the door frame which may be stamped from sheet steel to provide the usual pillars and cross members 76 and 76a. The door frame also includes a transverse stamped sheet metal panel 77 spot welded in position at points indicated at 78. In the present embodiment the door or body frame, including the pillars, cross members and panel 77, is pierced to provide a series of openings 79 of a size to receive the fastener lugs E. The door panel 77 is stamped to provide the usual molding flange 77a to which the garnish molding is attached within the window openings.

The trim panel C' may be readily mounted in position on the door, or other part of the body as the case may be, in the manner illustrated in Figs. 5 and 6. The assembly may be accomplished in a suitable jig by first placing the trim panel in position substantially as shown in Fig. 6 so that the fastener lugs E will line up with the openings 79. Owing to the fact that the trim panel is susceptible of flexing to a certain degree, the lugs may be forced into the openings 79 by applying pressure to the panel. When the lugs have cleared the back face of the panel 77 the panel is then slid vertically until the upper flange 75 has sprung over the molding flange 77a, as illustrated in Fig. 5. The trim panel will thus be rigidly locked in position by means of the fastener lugs which hook over the relatively rigid metallic edges of the openings 79, and the panel will be held against displacement by virtue of the top flange 75. Moreover, owing to the endwise taper of the lugs, the trim panel will be drawn tightly against the body frame by a wedging action between the cooperating metal portions of the trim panel and body framework. After the trim panel has been assembled in this manner the usual garnish molding 80 is fitted into position within the window opening, covering the flange portion 75 of the panel, and the parts are then secured together by means of screws 81.

In Figs. 9 to 11 inclusive, there is illustrated a further embodiment of the invention. In this instance the foundation or backing sheet 90 for the trim panel M is of relatively thin gauge sheet metal and the trim fabric 91 is applied and cemented in substantially the same manner as the fabric B shown in Fig. 1. The upper horizontal edge of the sheet 90 is formed with an inwardly extending flange 92 and the upright side edges are folded back upon themselves to provide folds 93 which are in the form of projecting portions spaced from the back face of the sheet 90 sufficiently to receive the fastener lugs. The bottom edge of the sheet 90 is also folded back upon itself to form a similar fold 93a which in like manner provides a projecting portion spaced from the back face of the sheet as shown at 93b in Fig. 11. Each of the projecting fold portions 93 is punched at intervals to provide slots or openings 94. In this instance the door frame portions are pressed to provide projecting hook shaped fastener lugs 95 and 95a. The lugs 95 on the door pillars project outwardly and the lugs 95a on the lower cross member project downwardly. These lugs are shown as being punched or pressed out of the metal of the door panel, but it will be understood that the lugs may be separately formed and attached in an integral manner by spot welding or riveting. The fastener lugs, however, in the preferred embodiments are preferably formed from the metal of the body frame or trim panel, as the case may be, since the lugs may be punched out during the formation of the parts in the dies or pattern rollers at substantially less expense.

In assembling the trim panel M on the door frame 76, 77, the trim panel is placed in position so that the openings 94 are opposite the fastener lugs 95. The trim panel is then pressed into position so as to project the fastener lugs 95 through the openings 94 until they clear the fastener portions 93, it being understood that the lugs 95a will at the same time clear the upper projecting edge of the fold 93a. The trim panel is then shifted upwardly until the top flange 92 is sprung over the molding flange 77a, and during this operation the fastener lugs at the sides will be shifted into position behind the fastener portions 93, and the lugs 95a will hook over the edge 93a. It will be seen that the manner of assembly of the panels in this embodiment is substantially the same as previously described, the construction differing in that the fastener hooks are located on the body and the cooperating slotted or apertured fastener portions are located on the trim panel.

Referring to the embodiment illustrated in Figs. 12 and 13, in this instance the backing sheet 96 for the trim panel N is also of sheet metal, and the fabric 97 is applied and cemented, and the panel formed, in the manner described above. In this form the laminated sheet is provided with side folds 98, a top inwardly extending flange 99, and a bottom fold 100. The metal and fabric, during the process of forming the panels in the pattern forming rollers, are preferably punched or pressed marginally to form downwardly extending fastener lugs 101 and 101a. It will be seen that these lugs extend in the opposite direction to the lugs E of the panel C', otherwise the construction is substantially identical and the method of forming the panel is identical. The door or body frame and panel 76 and 77 are pierced to provide openings 102 and 102a, as illustrated in Fig. 12. In assembling the trim panel N on the body according to this embodiment, the panel is placed flat against the frame 76, 77 with the flange 99 disposed a slight distance above the molding flange 77a and with the fastener lugs 101 projecting through the openings 102 and the lugs 101a projecting through the openings 102a. The trim panel is then shifted downwardly causing the lugs to hook over the edges of the openings until the flange 99 lies flush against the molding flange 77a. As in the previous embodiments the hook portions of the fastener lugs are preferably tapered in their length so that when the trim panel is slid into position the lugs will exert a wedging action effective to draw the panel tightly against the frame portions 76 and 77.

In the embodiment illustrated in Figs. 14 and 15 the trim panel O comprises a backing sheet 103 preferably of sheet metal which is covered with the fabric sheet 104. This laminated panel is also preferably formed in the manner previously described. The panel is provided with side folds 105 which along their free edges are formed at intervals with right angularly extending hook-shaped fastener lugs 106. The bottom edge of the panel is provided with a fold 107 which is punched at intervals to provide the right angularly extending fastener lugs 108. Also the upper edge of the panel has an inwardly extending flange 109 adapted to overlie the molding flange 77a. The hooks or lugs 106 and 108 may be cut or pierced from the laminated sheet during the travel of the continuous composite strip through the forming apparatus described in my co-pending application Serial No. 636,544, referred to above. During the edge folding operations the lugs may be struck out at right angles from the edges of the folds into the positions illustrated in Figs. 14 and 15. In this instance the door frame panel 77 is punched to provide slots 110 and 111 positioned to receive the fastener lugs. The trim panel O is assembled in substantially the same manner as described in connection with the embodiment of Fig. 12, the panel being placed against the door frame so that the hooks or lugs project through the slots. The panel is then forced downwardly until the flange 109 rests against the molding flange 77a. Owing to the wedge shape 106a of the fastener hooks the trim panel will be drawn tightly against the door frame by a wedging action.

Referring to the embodiment illustrated in Figs. 16 and 17, in this instance the trim panel P comprises a sheet metal backing sheet 112 having cemented thereto the trim fabric 113, the composite panel being preferably formed in the apparatus referred to above. At one side edge there is formed a fastener fold 114. The opposite side edge 115 and the top and bottom edges are inwardly flanged at 115, 116 and 117. In this instance the door or body frame panel 77 is provided at one side edge with a series of fastener lugs or hooks 118. These lugs may be separately formed and spot welded at 119 to the sheet steel panel 77, or if desired the lugs may be punched from the metal of the panel. The fold 114 of the trim panel is spaced from the back face of the sheet 112 to receive the lugs 118, as shown in Fig. 17, and the trim panel is assembled by flexing it adjacent the fold 114 sufficiently to cause the edge of the fold to project behind the outer ends of lugs 118. The trim panel is then slid laterally, to the left in Fig. 16, until the flange 116 is sprung over the flange 77a of the panel 77, it being understood that the bottom flange 117 underlies the bottom cross member of the frame 76 and the side flange 115 overlaps the side of the door pillar as shown in Fig. 17. The several flanges of the trim panel may be further fastened in position on the door frame against displacement by means of screws as illustrated.

From the foregoing it will be seen that the present invention provides an improved trim panel construction having fastener portions permanently attached thereto and adapted to be readily and easily mounted on the body frame work, the latter having permanently attached fastener portions cooperating with the fastener portions of the panel.

The trim panel may comprise a fabric covered metal backing sheet or a fabric covered non-metallic backing sheet. In the latter instance the fastener members may be permanently attached to the backing sheet and in the former instance they are preferably formed from the metal of the backing sheet.

I claim:

1. The combination of a trim panel including a trim cloth and a substantially coextensive metal sheet, and an automobile body frame, one thereof having projecting fastener devices integrally fixed thereto and the other having openings to receive said devices and also having metallic portions adjacent said openings effective in cooperation with said devices to clamp the panel by wedging action to the frame upon relatively shifting said panel and frame with respect to each other in parallel planes, said panel having the exposed surface unobstructed by said fastener devices.

2. In combination, a trim panel including a fabric covered metal backing sheet, a body frame support for said panel, one thereof having spaced rows of integral projecting fastener lugs pierced from the metal thereof and the other having spaced rows of apertures adapted to be alined with said lugs when the panel and support are juxtaposed and also having portions interlocking with said lugs to clamp the panel by wedging action to the support upon shifting one thereof in a plane substantially parallel to the plane of the other.

3. A composite trim panel comprising a metal sheet and a fabric sheet attached to the metal sheet at the front face thereof, said sheets being folded at opposite edges thereof to provide projecting portions at the face of the metal sheet, and fastener lugs formed from the metal of said folded portions at said last mentioned face of the metal sheet and disposed rearwardly of the plane thereof, said folded portions forming the sole support for said fastener lugs and the exposed face of the panel being unobstructed by said fastener lugs.

4. The combination of a trim panel including a metal sheet and a trim cloth carried thereby, and a body frame support therefor, said panel and support having interlocking metallic portions permanently secured thereto at opposite side edges for releasably fastening the panel to the support and concealed by the panel when assembled with the support, said portions comprising spaced folds and openings therebetween and projections adapted to be moved into said openings and positioned beneath said folds to interlock therewith, by sliding the panel on the support in juxtaposed relation thereto and in a plane substantially parallel thereto, said panel having its exposed surface unobstructed by said interlocking portions.

5. In a trim panel assembly for a vehicle body having spaced frame members, a trim panel comprising a metal sheet extending continuously between said frame members and spanning the same, a fabric sheet covering the outer face of said sheet, said sheet having in turned folded portions at its lateral edges and inwardly projecting wedge shaped fastener lugs formed from the metal of said folded portions, said frame members having apertures adapted to register with said lugs and metallic portions adjacent said openings effective in cooperation with said lugs to clamp the panel by wedging action upon relatively shifting said panel and frame, the exposed surface of said panel being unobstructed by said fastener lugs.

6. In a trim panel assembly for a vehicle body having laterally spaced metallic frame members, a metallic sheet extending continuously between said members and spanning the same, a fabric sheet covering the outer face of said sheet, said sheet having its lateral edges inturned to provide folds disposed opposite to said frame members, and inwardly projecting fastener lugs formed integrally from the folds and registering with spaced apertures in the frame members for interlocking the panel and members together, the exposed surface of said panel being unobstructed by said fastener lugs.

7. In a trim panel assembly for a vehicle body door having laterally spaced frame members and a metal panel connecting the same, a fabric covered metal sheet extending continuously between said members and having its lateral edges inturned to provide edge folds overlapping said frame members, and fastener lugs extending outwardly from said panel and adapted to interlock with said folds for clamping said sheet to the frame members, the exposed surface of said panel being unobstructed by said fastener lugs.

8. In a trim panel assembly for a vehicle body door having laterally spaced frame members and a metal panel connecting the same, a fabric covered metal sheet extending continuously between said members and having its lateral edges inturned to provide edge folds overlapping said frame members, and fastener lugs struck out from said panel and adapted to interlock with said folds for clamping said sheet to the frame members, the exposed surface of said panel being unobstructed by said fastener lugs.

9. In a trim panel assembly, a vehicle door having spaced frame members and a metal panel connecting the same, a fabric covered sheet metal panel extending continuously between said members and having its side edges inturned to provide edge folds overlapping said frame members, and spaced rows of fastener lugs struck out from the metal of one of the panels and registering with spaced rows of apertures in the other panel for clamping the panels together upon relatively sliding the same together, the exposed surface of said panel being unobstructed by said fastener lugs.

10. In a trim panel assembly for a vehicle body having a metal supporting panel, a trim panel including a fabric covered metal backing sheet having its vertical side edges inturned to provide folds, one of said panels having vertically disposed rows of fastener lugs struck from the metal thereof and the other having vertically disposed rows of apertures to receive said lugs and permit the panels to be clamped together upon relatively sliding them in a substantially vertical direction, the exposed surface of said panel being unobstructed by said fastener lugs.

11. The combination with a trim panel member including a trim cloth and a substantially coextensive metal sheet, and an automobile body member, one of said members having projecting fastener devices integrally fixed thereto and extending along one face of the member in spaced relation therewith and the other member having openings to receive said fastener devices in interlocked relation, whereby portions of said other member adjacent said openings are frictionally held between said member and said projecting fastener devices.

12. A trim panel including a fabric covered metal backing sheet having its vertical side edge portions inturned at the back of the sheet and provided with lugs integrally fixed thereto and all projecting rearwardly and extending in the same direction along one face of the sheet.

13. A trim panel including a fabric covered metal backing sheet having its vertical side edge portions inturned at the back of the sheet and provided with lugs integrally fixed thereto and all projecting rearwardly and extending in the same direction along one face of the sheet, said lugs being tapered in their length and having reinforcing ribs.

ALBERT P. BALL.